United States Patent
Zhang et al.

(10) Patent No.: US 8,897,272 B2
(45) Date of Patent: Nov. 25, 2014

(54) RADIO COMMUNICATION SYSTEM CHANNEL STATE INFORMATION FEEDBACK METHOD AND DEVICE

(71) Applicant: Fujitsu Limited, Kawasaki-shi, Kanagawa (JP)

(72) Inventors: Yuantao Zhang, Beijing (CN); Yuanrong Lan, Beijing (CN); Yi Zhang, Beijing (CN); Hua Zhou, Beijing (CN); Jianming Wu, Beijing (CN)

(73) Assignee: Fujitsu Limited, Kawasaki (JP)

( * ) Notice: Subject to any disclaimer, the term of this patent is extended or adjusted under 35 U.S.C. 154(b) by 76 days.

(21) Appl. No.: 13/711,183

(22) Filed: Dec. 11, 2012

(65) Prior Publication Data

US 2013/0121318 A1    May 16, 2013

Related U.S. Application Data

(63) Continuation of application No. PCT/CN2010/074141, filed on Jun. 21, 2010.

(51) Int. Cl.
*H04J 3/00* (2006.01)
*H04W 4/00* (2009.01)
*H04L 1/00* (2006.01)
*H04W 72/04* (2009.01)
*H04W 72/08* (2009.01)

(52) U.S. Cl.
CPC ............. *H04W 72/08* (2013.01); *H04L 1/0029* (2013.01); *H04W 72/04* (2013.01); *H04L 1/0026* (2013.01)
USPC .......................................... 370/336; 370/329

(58) Field of Classification Search
None
See application file for complete search history.

(56) References Cited

U.S. PATENT DOCUMENTS

2011/0134771 A1* 6/2011 Chen et al. .................... 370/252
2011/0142144 A1* 6/2011 Allpress et al. ............... 375/259
2011/0268067 A1* 11/2011 Seo et al. ....................... 370/329
2012/0188976 A1* 7/2012 Kim et al. ...................... 370/329

FOREIGN PATENT DOCUMENTS

WO    2009023850    2/2009
WO    2009088225    7/2009

OTHER PUBLICATIONS

ETSI TS 136 213 V9.0.1 (Jan. 2010) LTE; Evolved Universal Terrestrial Radio Access (E-UTRA); Physical layer procedures (3GPP TS 36.213 version 9.0.1 Release 9); dated Jan. 2010.
International Search Report issued for corresponding International Patent Application No. PCT/CN2010/074141, mailed Mar. 31, 2011.

(Continued)

*Primary Examiner* — Edan Orgad
*Assistant Examiner* — Rebecca Song
(74) *Attorney, Agent, or Firm* — Myers Wolin, LLC

(57) ABSTRACT

A method for Channel State Information (CSI) feedback in a wireless communication system includes: determining parameters required for the CSI feedback in a first wireless communication system, so that a feedback structure of the first wireless communication system in Physical Uplink Control Channel (PUCCH) is based on a feedback structure of a second wireless communication system in the PUCCH; notifying the parameters to a user equipment; transmitting a Channel State Information Reference Symbol (CSI-RS) to the user equipment periodically, so that the user equipment calculates the CSI required to be fed back; and receiving the CSI fed back by the user equipment according to the feedback structure of the first wireless communication system in the PUCCH in response to the CSI-RS, wherein information fed back for each BP is information obtained by jointly encoding optimum subband Channel Quality Information (CQI) with optimum subband Pre-encoding Matrix Information (PMI) in the BP.

5 Claims, 6 Drawing Sheets

(56) References Cited

OTHER PUBLICATIONS

Notice of Reason for Refusal issued for corresponding Japanese patent application No. 2013-515655, mailed Mar. 11, 2014, with English translation.

Samsung; "Performance evaluations of Rel. 10 feedback framework"; Agenda Item: 6.3.4; 3GPP TSG RAN WG1 Meeting #61; R1-103378; Montreal, Canada; May 10-14, 2010.

* cited by examiner

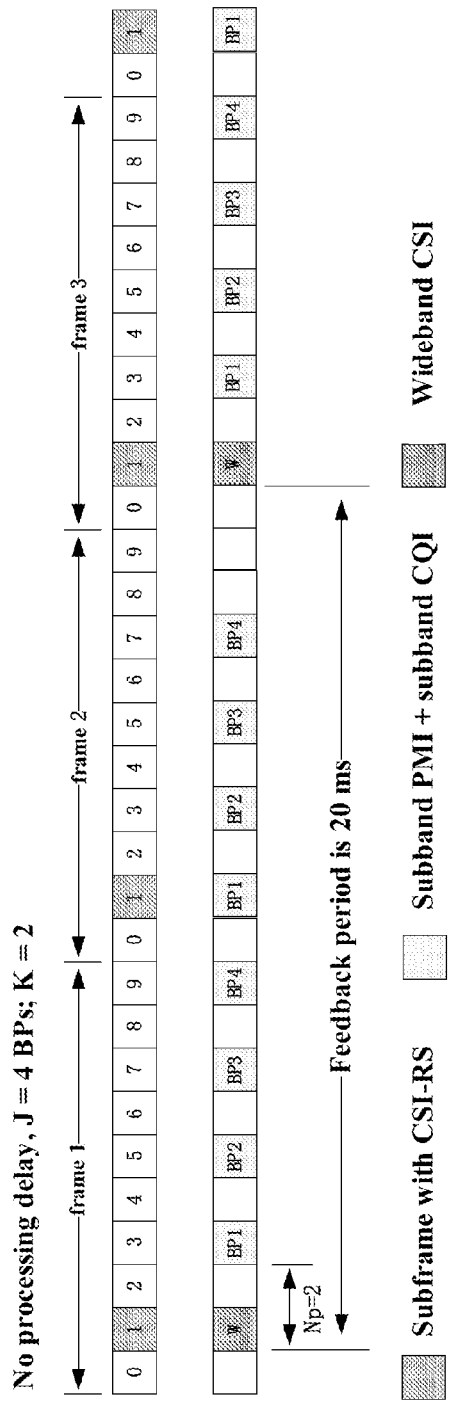
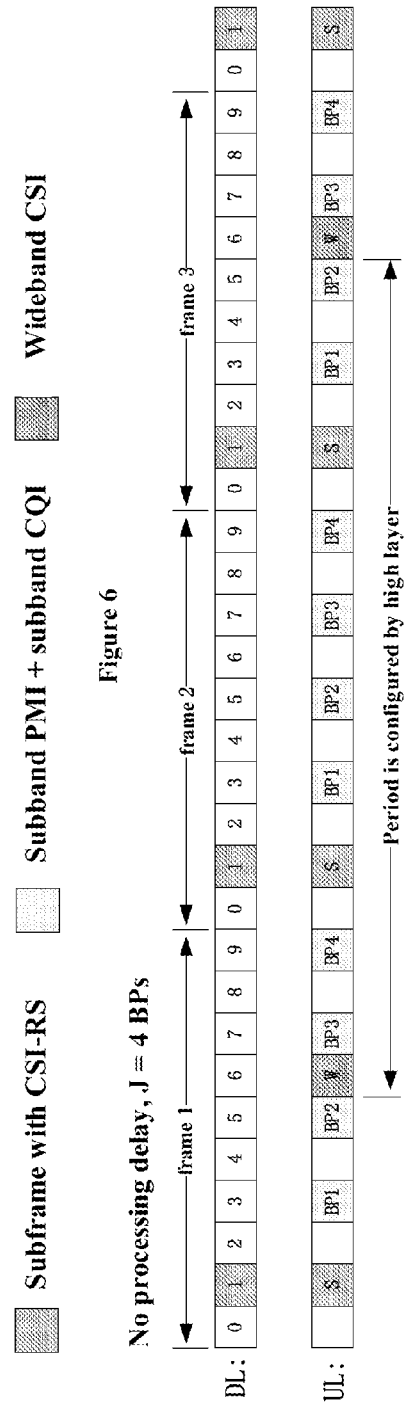
Figure 6
Figure 7

RADIO COMMUNICATION SYSTEM CHANNEL STATE INFORMATION FEEDBACK METHOD AND DEVICE

CROSS-REFERENCE TO RELATED APPLICATIONS

The present application is a continuation of PCT Application No. PCT/CN2010/074141 filed on Jun. 21, 2010, the contents of which are herein wholly incorporated by reference.

FIELD OF THE INVENTION

The present invention relates to the field of mobile communication, and in particular, to a method and apparatus for CSI (Channel State Information) feedback in a wireless communication system.

BACKGROUND OF THE INVENTION

In a multiple antenna communication system, user equipment utilizes pilot frequency to perform channel estimation, and utilizes values of channel estimation to calculate CSI such as CQI (Channel Quality Information), PMI (Pre-coding Matrix Information), RI (Rank Information) and the like. After such CSI is fed back to a base station by the user equipment, it can be used by the base station for scheduling of the user equipment, and for selecting of a suitable coding modulation manner, a pre-coding transmission manner and the like for the scheduled user equipment.

The LTE (Long Term Evolution) system and the LTE-A (Long Term Evolution-Advanced) system adopt a same resource allocation structure. As shown in FIG. 1, a system bandwidth may be divided into n BPs (Bandwidth Parts), each of which in turn contains k subbands. When the CSI is fed back by the user equipment, the CSI corresponding to the subband whose CQI is optimal in each BP, together with the index of the subband, shall be fed back to the base station.

In the LTE system, there are four modes of CSI feedback in a control channel:
Mode 1-0; Mode 1-1; Mode 2-0; and Mode 2-1.
For the fourth modes, each contains four transmission types as follows.

Type 1: subband CQI, i.e., the channel quality information of the subband. The CQI prescribed in the LTE standard is an index of a coding modulation manner. The base station can determine the coding modulation manner according to the CQI fed back by the user equipment.

Type 2: wideband CQI+wideband PMI, i.e., the channel quality information of the wideband and the pre-coding matrix information of the wideband. The base station selects a pre-coding matrix according to the value of wideband PMI.

Type 3: RI, i.e., the rank information. The base station obtains the number of data flows according to this information.

Type 4: wideband CQI, i.e., the channel quality information of the wideband.

The transmission types corresponding to each of the feedback modes are as shown in Table 1.

TABLE 1

| PUCCH type number | Feedback contents | Mode status | PUCCH mode | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 1 | Subband CQI | RI = 1 | NA | 4 + L | NA | 4 + L |
| | | RI > 1 | NA | 7 + L | NA | 4 + L |
| 2 | Wideband CQI/PMI | 2 transmitting antennas, RI = 1 | 6 | 6 | NA | NA |
| | | 4 transmitting antennas, RI = 1 | 8 | 8 | NA | NA |
| | | 2 transmitting antennas, RI > 1 | 8 | 8 | NA | NA |
| | | 4 transmitting antennas, RI > 1 | 11 | 11 | NA | NA |
| 3 | RI | 2-layer spatial multiplexing | 1 | 1 | 1 | 1 |
| | | 4-layer spatial multiplexing | 2 | 2 | 2 | 2 |
| 4 | Wideband CQI | RI = 1 or RI > 1 | NA | NA | 4 | 4 |

In Table 1, NA indicates that such information is not transmitted, and L is the index of the subband.

As shown in Table 1, taking the feedback mode 2-1 as an example, the information to be fed back is:
1) Subband CQI, the number of bits of which is 4+L or 7+L;
2) Wideband CQI/PMI, the number of bits of which varies depending on the number of the transmitting antennas, for example, is 11 if there are 4 antennas; and
3) RI, the number of bits of which is 1 or 2.
The other feedback modes are similar to those described above.

FIG. 2 gives a feedback instance for the feedback mode 2-1. The parameters are defined as follows.
1) J: the number of BPs corresponding to the system bandwidth one by one.
2) K: the number of times that the subband with the optimal CQI in the BP occurs during two wideband feedbacks.
3) Np: the time interval of subband CSI feedback.
4) H*Np=(J*K+1)*Np: the feedback period of the wideband CSI.

Firstly, the base station configures the parameters K and Np by a high layer such as the MAC (Media Access Control) sub-layer or the RRC (Radio Resource Control) sub-layer, and transfers such parameters to the user equipment. The configuration may be based on information on the present moving speed of the user equipment or the like. For example, if the user equipment is nearly at rest, the feedback period of the feedback subband CSI may be made long, that is, the value of Np and/or the value of K may be increased. The user equipment determines the feedback period of the wideband CSI according to the parameters J, K, and Np.

As shown in FIG. 2, the feedback period of wideband CQI+wideband PMI (Type 2) in the feedback mode 2-1 is H*Np=18 ms, and the feedback time interval of the corresponding subband with the optimal CQI in each BP is 2 ms, that is, Np=2. There are two feedback chances for each BP between two feedbacks of Type 2, that is, K=2.

In the discussion of the present LTE-A system, it has decided that the mode of the CSI feedback in the PUCCH (Physical Uplink Control CHannel) is natural extension of the CSI feedback mode prescribed in the LTE system. However, the LTE-A system can not adopt directly the feedback mode of the LTE system for the following three reasons.

1. In the LTE-A system, there is a pilot frequency CSI-RS (CSI Reference Symbol) dedicated for estimating of CSI. The CSI-RS generally has two transmission periods: 10 ms and 5 ms. In contrast, in the LTE system, the pilot frequency CRS for estimating of CSI is transmitted in each subframe, and is also used for channel estimation at the receiving end, for demodulating of data. That is, the user equipment in the LTE system calculates and obtains the CSI to be fed back according to the CRS of various subframes at a plurality of CSI feedback positions, while the user equipment in the LTE-A system can only calculate and obtain the CSI at a plurality of feedback positions according to the CSI-RS in a certain subframe.

2. It has been decided in the LTE-A system that the subband PMI is fed back in the control channel, while the LTE system does not support that such information is fed back in the control channel. That is, additional subband PMI information shall be fed back in the LTE-A system compared with the LTE system.

3. The LTE-A system adopts double codebook structure, i.e., pre-coding matrix W=W1*W2. W1 is selected from codebook 1 and targets wideband/long-term channel properties. W2 is selected from codebook 2 and targets narrowband/short-term channel properties. Both W1 and W2 shall be fed back. In contrast, the LTE system adopts single codebook structure.

Therefore, it is desirable to provide a method and apparatus for CSI feedback in the LTE-A system which enable the uplink control signaling feedback structure of the LTE-A system to substantially reuse the feedback structure of the LTE system, thus addressing the feedback issue of the control signaling in the LTE-A system while resulting in few alterations of system software and hardware.

SUMMARY OF THE INVENTION

Hereinafter, there is provided a brief summary about the present invention in order to provide a basic understanding on certain aspects of the invention. However, it should be understood that this summary is not an exhaustive summary about the invention. It is not intended to determine critical portions or important portions of the invention, nor does it intend to limit the scope of the invention. The object thereof is only to propose some concepts with respect to the invention in a simplified form, thereby to be a prelude of the more detailed description given later.

In light of above situations in the prior art, an object of the invention is to provide a method and apparatus for CSI feedback in a wireless communication system which enable the uplink control signaling feedback structure of a first wireless communication system (e.g. the LTE-A system) to substantially reuse the feedback structure of a second wireless communication system (e.g. the LTE system), thus addressing the feedback issue of the control signaling in the first wireless communication system while resulting in few alterations of system software and hardware.

To achieve the above object, according to an aspect of the invention, there is provided a method for CSI feedback in a wireless communication system including: determining parameters required for the CSI feedback in a first wireless communication system, the parameters including a feedback period P of wideband CSI, the number of times K of information feedback for each of BPs in system bandwidth within the feedback period P of the wideband CSI, and a time interval Np between adjacent BP information feedback within the feedback period P of the wideband CSI, so that a feedback structure of the first wireless communication system in PUCCH is based on a feedback structure of a second wireless communication system in the PUCCH; notifying the parameters to a user equipment; transmitting a CSI-RS to the user equipment periodically, so that the user equipment calculates the CSI required to be fed back; and receiving the CSI fed back by the user equipment according to the feedback structure of the first wireless communication system in the PUCCH in response to the CSI-RS, wherein information fed back for each BP is information obtained by jointly encoding optimum subband CQI with optimum subband PMI in the BP.

According to another aspect of the invention, there is further provided a method for CSI feedback in a wireless communication system including: determining parameters required for the CSI feedback in a first wireless communication system, the parameters including a feedback period P of optimum subband PMI, the number of times K of information feedback for each of BPs in system bandwidth within the feedback period P of the optimum subband PMI, a time interval Np between adjacent BP information feedback within the feedback period P of the optimum subband PMI, and a feedback period and a feedback position offset of wideband CSI, so that a feedback structure of the first wireless communication system in PUCCH is based on a feedback structure of a second wireless communication system in the PUCCH; notifying the parameters to a user equipment; transmitting a CSI-RS to the user equipment periodically, so that the user equipment calculates the CSI required to be fed back; and receiving the CSI fed back by the user equipment according to the feedback structure of the first wireless communication system in the PUCCH in response to the CSI-RS, wherein the optimum subband PMI fed back is information obtained by jointly encoding the optimum subband PMI in all of the BPs.

According to another aspect of the invention, there is further provided an apparatus for CSI feedback in a wireless communication system including: a parameter determination unit adapted to determine parameters required for the CSI feedback in a first wireless communication system, the parameters including a feedback period P of wideband CSI, the number of times K of information feedback for each of BPs in system bandwidth within the feedback period P of the wideband CSI, and a time interval Np between adjacent BP information feedback within the feedback period P of the wideband CSI, so that a feedback structure of the first wireless communication system in PUCCH is based on a feedback structure of a second wireless communication system in the PUCCH; a parameter notification unit adapted to notify the parameters determined by the parameter determination unit to a user equipment; a signaling transmission unit adapted to transmit a CSI-RS to the user equipment periodically, so that the user equipment calculates the CSI required to be fed back; and a feedback information reception unit adapted to receive the CSI fed back by the user equipment according to the feedback structure of the first wireless communication system in the PUCCH in response to the CSI-RS transmitted by the signaling transmission unit, wherein information fed back for each BP is information obtained by jointly encoding optimum subband CQI with optimum subband PMI in the BP.

According to another aspect of the invention, there is further provided an apparatus for CSI feedback in a wireless communication system including: a parameter determination unit adapted to determine parameters required for the CSI feedback in a first wireless communication system, the parameters including a feedback period P of optimum subband PMI, the number of times K of information feedback for each of BPs in system bandwidth within the feedback period P of the optimum subband PMI, a time interval Np between adjacent BP information feedback within the feedback period P of the optimum subband PMI, and a feedback period and a feedback position offset of wideband CSI, so that a feedback structure of the first wireless communication system in PUCCH is based on a feedback structure of a second wireless communication system in the PUCCH; a parameter notification unit adapted to notify the parameters determined by the parameter determination unit to a user equipment; a signaling transmission unit adapted to transmit a CSI-RS to the user equipment periodically, so that the user equipment calculates the CSI required to be fed back; and a feedback information reception unit adapted to receive the CSI fed back by the user equipment according to the feedback structure of the first wireless communication system in the PUCCH in response to the CSI-RS transmitted by the signaling transmission unit, wherein the optimum subband PMI fed back is information obtained by jointly encoding the optimum subband PMI in all of the BPs.

According to another aspect of the invention, there is further provided a wireless communication system including a base station and a user equipment, the base station including the apparatus for CSI feedback in a wireless communication system according to the invention, and the user equipment including: a parameter reception and determination unit adapted to receive and determine parameters required for the CSI feedback in the wireless communication system from the base station; a signaling reception unit adapted to receive a CSI-RS transmitted from the base station; a feedback information calculation unit adapted to calculate the CSI required to be fed back in response to the CSI-RS received by the signaling reception unit; and a feedback information transmission unit adapted to transmit the CSI calculated by the feedback information calculation unit to the base station.

According to another aspect of the invention, there is further provided a computer program product including machine-readable instruction codes stored therein, wherein the instruction codes, when being read and executed by a computer, enable the computer to perform the method for CSI feedback in a wireless communication system according to the invention.

In the technical solution of the invention mentioned above, the uplink control signaling feedback structure of the first wireless communication system substantially reuses the feedback structure of the second wireless communication system, thus addressing the feedback issue of the control signaling in the first wireless communication system while resulting in few alterations of system software and hardware.

BRIEF DESCRIPTION OF THE DRAWINGS

The invention can be better understood by referring to the detailed description given hereinafter in combination with the accompany drawings in which identical or similar components are denoted by identical or similar reference numbers. The accompany drawings together with the detailed description below are included in the specification and form parts of the specification for further illustrating preferred embodiments of the invention and explaining principles and advantages of the invention by way of example. Wherein:

FIG. 6 is a schematic diagram illustrating another example for CSI feedback in the LTE-A system according to the embodiment of the invention;

FIG. 7 is a schematic diagram illustrating another example for CSI feedback in the LTE-A system according to the embodiment of the invention;

Figure 1:
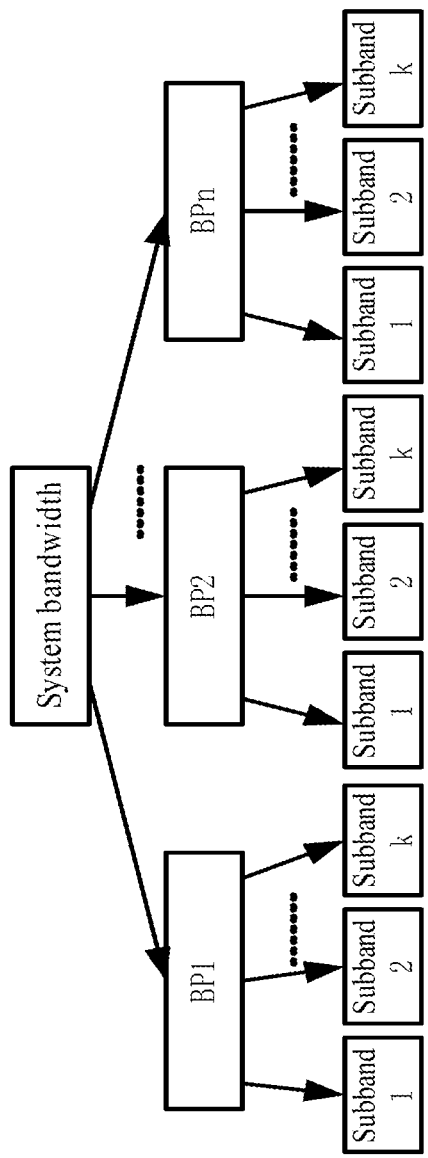
FIG. 1 is a schematic diagram illustrating a resource allocation structure adopted in LTE and LTE-A systems.

Those skilled in the art should understand that elements in the drawings are only shown for the purpose of simplicity and clarity, and are not necessarily drawn to scales. For example, sizes of certain elements in the drawings may be enlarged relative to other elements so that it is helpful to improve the understanding on the embodiments of the invention.

DETAILED DESCRIPTION OF THE INVENTION

Hereinafter, an exemplary embodiment of the invention will be described in combination with the drawings. For the purpose of clarity and simplicity, not all the features of the actual embodiment are described in the specification. However, it should be appreciated that it has to make a lot of decisions specific to the embodiments during a process for developing any such actual embodiments in order to achieve specific targets of developers, for example, complying with those restrictive conditions related to systems and operations, and these restrictive conditions may vary with different embodiments. Further, it should also be appreciated that although developing work may be very complex and time-consuming, such developing work is merely a routine task for those skilled in the art who benefit from the present disclosure.

Herein, there is still one point needed to be illustrated that, for preventing unnecessary details from obscuring the invention, only the device structures and/or processing steps closely related to the scheme according to the invention are shown in the drawings, and other details having little to do with the invention are omitted.

Hereinafter, taking it as an example that a first wireless communication system is the LTE-A system and a second wireless communication system is the LTE system, the method and apparatus for CSI feedback in a wireless communication system according to the embodiment of the invention is described in detail with reference to the drawings.

Figure 3:
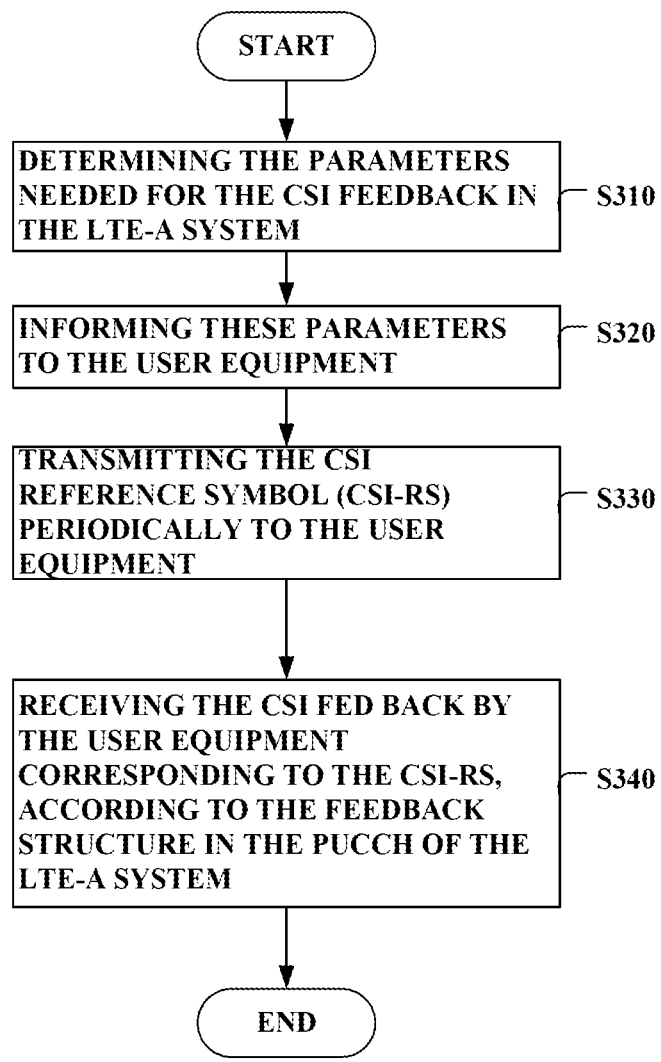
FIG. 3 is a flow chart illustrating a method for CSI feedback in the LTE-A system according to an embodiment of the invention.

FIG. 3 is a flow chart illustrating a method for CSI feedback in the LTE-A system according to an embodiment of the invention.

As shown in FIG. 3, firstly, in step S310, parameters required for the CSI feedback in the LTE-A system are determined. Those parameters are determined such that a feedback structure of the LTE-A system in PUCCH can be based on a feedback structure of the LTE system in the PUCCH.

Next, in step S320, the parameters determined in step S310 are notified to user equipment.

Next, in step S330, a CSI-RS is transmitted to the user equipment periodically, so that the user equipment calculates the CSI required to be fed back.

At last, in step S340, the CSI fed back by the user equipment according to the feedback structure of the LTE-A system in the PUCCH in response to the CSI-RS is received.

In order to further describe the invention, the method for CSI feedback in the LTE-A system according to the invention will be described below in conjunction with specific embodiments.

First Embodiment

In the method for CSI feedback in the LTE-A system according to a first embodiment of the invention, the parameters determined in step S310 shown in FIG. 3 include a feedback period P of wideband CSI, the number of times K of information feedback for each of BPs in system bandwidth within the feedback period P of the wideband CSI, and a time interval Np between adjacent BP information feedback within the feedback period P of the wideband CSI.

According to the preferred embodiment, determining of the parameters required for the CSI feedback in the LTE-A system may be implemented by the following steps: firstly, configuring the parameters K and Np through a high layer such as a MAC layer or a RRC layer; and then calculating, in accordance with the parameters K and Np and a number J of the BPs determined by the system bandwidth, the feedback period P of the wideband CSI through a formula of $P=(J*K+1)*Np$.

Thus, since the user equipment may also determine the number J of the BPs through the system bandwidth, only information containing the number of times K of information feedback and the time interval Np is required to be transmitted to the user equipment when the step S320 shown in FIG. 3 is performed. The user equipment may also calculate the feedback period P of the wideband CSI through the formula of $P=(J*K+1)*Np$.

After the user equipment accomplishes the determining of the parameters required for the CSI feedback in the LTE-A system, it may feedback the CSI according to the feedback structure of the LTE-A system in the PUCCH in response to the received CSI-RS.

In the method for CSI feedback in the LTE-A system according to the first embodiment of the invention, the PMI and the corresponding CQI thereof for each subband are jointly encoded, and are fed back at a feedback position of the subband CQI prescribed in the LTE system. That is, information fed back for each BP is information obtained by jointly encoding optimum subband CQI with optimum subband PMI in the BP. Additionally, the feedback position of the wideband CSI is the same as that prescribed in the LTE system. In the invention, the wideband CSI may be wideband PMI+wideband CQI or may be wideband PMI only, which is also applicable for the subsequent embodiments.

With the method for CSI feedback in the LTE-A system according to the first embodiment of the invention, a case of repeated feedback, i.e., a case that a same CSI for a certain subband is fed back twice at different positions, may occur with some feedback parameters. In order to address such case, the method according the preferred embodiment of the invention may further perform the step of judging, in accordance with the determined parameters, whether a repeated feedback of information for the BP will occur when the user equipment feeds back the calculated CSI in response to the CSI-RS. If it is determined that the repeated feedback will occur, the user equipment may perform the following operations at the position of repeated feedback.

1) The user equipment does not feed back any information at a position where the repeated feedback will occur, and does not calculate information for the BP at the position, or 2) the user equipment feeds back other CSI information such as RI, wideband PMI, wideband CQI or the like instead of subband PMI and subband CQI at the position where the repeated feedback will occur. That is, the user equipment feeds back other information than the information obtained by jointly encoding the optimum subband CQI with the subband PMI in the BP at the position where the repeated feedback will occur.

Figure 4:
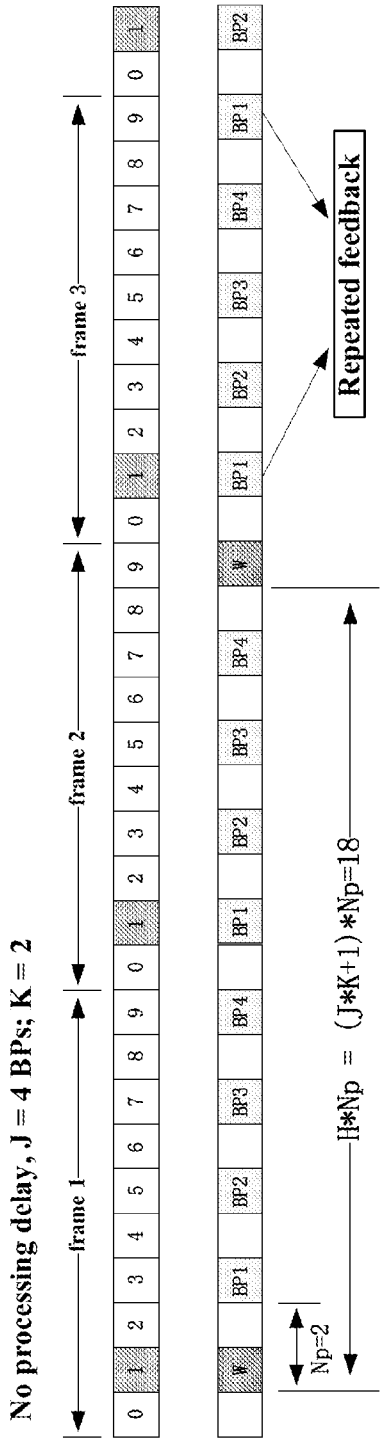
FIG. 4 is a schematic diagram illustrating an example for CSI feedback in the LTE-A system according to the embodiment of the invention.
Figure 5:
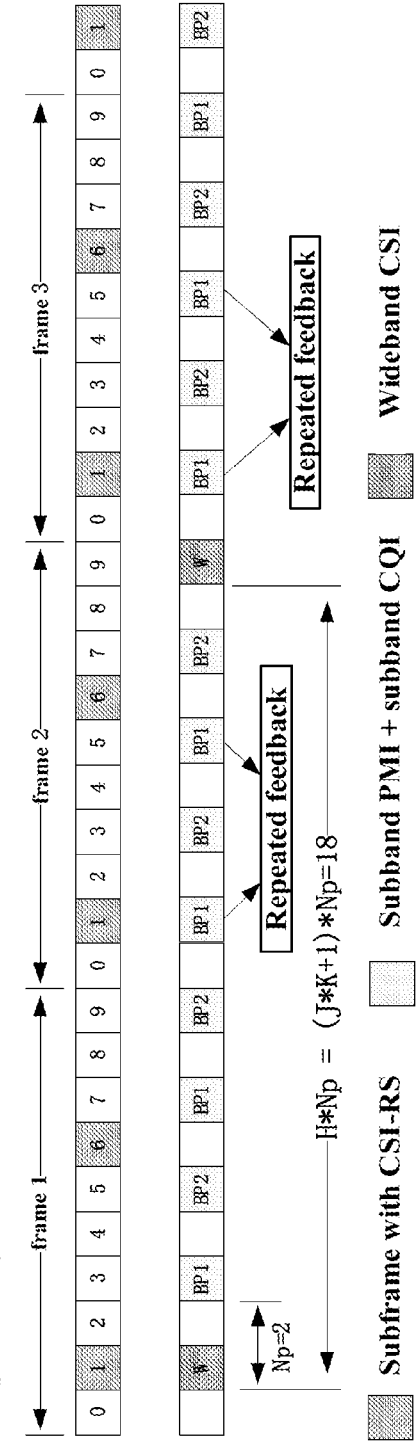
FIG. 5 is a schematic diagram illustrating another example for CSI feedback in the LTE-A system according to the embodiment of the invention.

Hereinafter, the method for CSI feedback in the LTE-A system according to the first embodiment of the invention is described in detail with reference to FIGS. 4 and 5. FIG. 4 is a schematic diagram illustrating an example for CSI feedback in the LTE-A system according to the first embodiment of the invention. FIG. 5 is a schematic diagram illustrating another example for CSI feedback in the LTE-A system according to the first embodiment of the invention.

Figure 2:
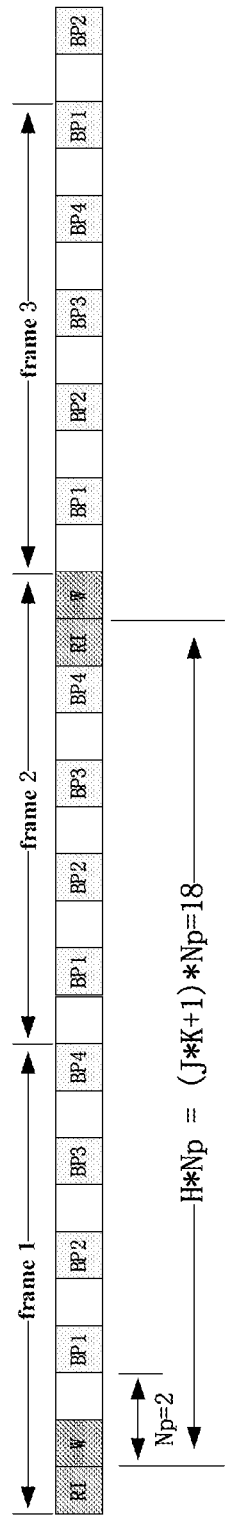
FIG. 2 is a schematic diagram illustrating an example for CSI feedback in the LTE system.

It can be known from the comparison of FIG. 4 with FIG. 2 that the feedback structure of the LTE-A system in the PUCCH according to the first embodiment of the invention is substantially same as the feedback structure of the LTE system in the PUCCH. The main distinction lies in that the information fed back for each BP is not the optimum subband CQI in the BP, but the information obtained by jointly encoding optimum subband CQI with optimum subband PMI in the BP.

As shown in FIG. 4, the CSI-RS is transmitted in the first subframe in each frame, and the transmission period is 10 ms. It is assumed that there is no processing delay, that is, the user equipment will feed back a corresponding CSI immediately after receiving the CSI-RS. The problem of this solution lies in that the user equipment may calculate values of the CSI of respective subbands in some BP repeatedly according to a same CSI-RS and feed back same values of the CSI at different timings. In frame 3 shown in FIG. 4, the CQI/PMI corresponding to respective subbands of BP1 will be calculated repeatedly and fed back in the two subframes denoted in the Figure. The respective feedback parameters such as the number of BPs or the like determine whether the case of repeated calculation occurs or not. That is, after the configuration of the feedback parameters by the high layer is accomplished, the user equipment can derive whether the case of repeated calculation occurs or not. Therefore, feasible solutions solving this problem are as follows.

1. The user equipment does not perform repeated calculation and keeps silent at the position where the repeated feedback will occur.

2. The user equipment feeds back other CSI such as the RI, the wideband PMI or the like at the position where the repeated feedback will occur.

The example shown in FIG. 5 is similar to that in FIG. 4, in which a case of repeated feedback when the transmission period of the CSI-RS is 5 ms is shown. It can be known from the examples shown in FIGS. 4 and 5 that, in the method for CSI feedback in the LTE-A system according to the first embodiment of the invention, the probability that the case of repeated feedback occurs is relatively high. With the solutions mentioned above according the preferred embodiment, however, this problem can be solved effectively.

Second Embodiment

In the method for CSI feedback in the LTE-A system according to a second embodiment of the invention, the parameters determined in step S310 shown in FIG. 3 also include a feedback period P of wideband CSI, the number of times K of information feedback for each of BPs in system bandwidth within the feedback period P of the wideband CSI, and a time interval Np between adjacent BP information feedback within the feedback period P of the wideband CSI.

However, the manner for determining parameters required for the CSI feedback in the LTE-A system in the second embodiment is different from that in the first embodiment. In the method for CSI feedback in the LTE-A system according to the second embodiment of the invention, there are two manners for determining parameters required for the CSI feedback in the LTE-A system as follows.

In the first manner, firstly, the feedback period P of the wideband CSI is configured through a high layer, so that the feedback period P of the wideband CSI is an integral multiple of a transmission period of the CSI-RS. Hereafter, the number of times K of information feedback is determined firstly, and then, in accordance with the feedback period P of the wideband CSI, the number of times K of information feedback, and a number J of the BPs in the system bandwidth, the time interval Np is calculated through a formula of $Np=\lfloor P/(J*K+1)\rfloor$.

Thus, since the user equipment may also determine the number J of the BPs through the system bandwidth, only information containing the feedback period P of the wideband CSI and the number of times K of information feedback is required to be transmitted to the user equipment when the step S320 shown in FIG. 3 is performed. The user equipment may also calculate the time interval Np through the formula of $Np=\lfloor P/(J*K+1)\rfloor$.

In the second manner for determining parameters required for the CSI feedback in the LTE-A system, firstly, the feedback period P of the wideband CSI is also configured through a high layer, so that the feedback period P of the wideband CSI is an integral multiple of a transmission period of the CSI-RS. Hereafter, the time interval Np is determined firstly, and then, in accordance with the feedback period P of the wideband CSI, the time interval Np, and a number J of the BPs in the system bandwidth, the number of times K of information feedback is calculated through a formula of $K=\lfloor (P/Np-1)/J\rfloor$.

Thus, since the user equipment may also determine the number J of the BPs through the system bandwidth, only information containing the feedback period P of the wideband CSI and the time interval Np is required to be transmitted to the user equipment when the step S320 shown in FIG. 3 is performed. The user equipment may also calculate the number of times K of information feedback through the formula of $K=\lfloor (P/Np-1)/J\rfloor$.

After the user equipment accomplishes the determining of the parameters required for the CSI feedback in the LTE-A system, it may feedback the CSI according to the feedback structure of the LTE-A system in the PUCCH in response to the received CSI-RS.

In the method for CSI feedback in the LTE-A system according to the second embodiment of the invention, the PMI and the corresponding CQI thereof for each subband are also jointly encoded, and are fed back at a feedback position of the subband CQI prescribed in the LTE system. That is, information fed back for each BP is information obtained by jointly encoding optimum subband CQI with optimum subband PMI in the BP. Additionally, the feedback position of the wideband CSI may be different from that prescribed in the LTE system, and may be an integral multiple of 10 ms. The specific feedback period is configured by the high layer.

With the method for CSI feedback in the LTE-A system according to the second embodiment of the invention, a case that a same CSI for a certain subband is fed back twice at different positions, i.e., a case of repeated feedback which will occur in the first embodiment may be avoided.

FIG. 6 illustrates an example for CSI feedback in the LTE-A system according to the second embodiment of the invention. It can be seen from FIG. 6 that the feedback structure of the LTE-A system in the PUCCH according to the second embodiment of the invention is also similar to the feedback structure of the LTE system in the PUCCH. However, the information fed back for each BP is not the optimum subband CQI in the BP, but the information obtained by jointly encoding optimum subband CQI with optimum subband PMI in the BP.

As shown in FIG. 6, the base station firstly determines the feedback period P of the wideband CSI, which is P=20 ms in this example. Then, the base station determines two parameters. The first parameter is the number of times K of the selected subband CSI feedback for each of BPs between two wideband CSI feedback positions, which is K=2 herein. The second parameter is the time interval Np between adjacent BP information feedback, which is $Np=\lfloor P/(J*K+1)\rfloor=2$ determined according to three parameters of P=20, K=2, and J=4. Since the feedback period P of the wideband CSI is configured to be an integral multiple of a transmission period of the CSI-RS, the case of repeated feedback shown in FIGS. 4 and 5 will not occur.

Third Embodiment

In the method for CSI feedback in the LTE-A system according to a third embodiment of the invention, the parameters determined in step S310 shown in FIG. 3 include a feedback period P of optimum subband PMI, the number of times K of information feedback for each of BPs in system bandwidth within the feedback period P of the optimum subband PMI, a time interval Np between adjacent BP information feedback within the feedback period P of the optimum subband PMI, and a feedback period and a feedback position offset of wideband CSI.

Similarly to the second embodiment, In the method for CSI feedback in the LTE-A system according to the third embodiment of the invention, there are two manners for determining parameters required for the CSI feedback in the LTE-A system as follows.

In the first manner, firstly, the feedback period P of the optimum subband PMI and the feedback period and feedback position offset of the wideband CSI are configured through a high layer, wherein the feedback period P of the optimum subband PMI is an integral multiple of a transmission period of the CSI-RS. Hereafter, the number of times K of information feedback is determined firstly, and then, in accordance with the feedback period P of the optimum subband PMI, the number of times K of information feedback, and a number J of the BPs in the system bandwidth, the time interval Np is calculated through a formula of $Np=\lfloor P/(J*K+1) \rfloor$.

Thus, since the user equipment may also determine the number J of the BPs through the system bandwidth, only information containing the feedback period P of the optimum subband PMI, the number of times K of information feedback, and the feedback period and feedback position offset of the wideband CSI is required to be transmitted to the user equipment when the step S320 shown in FIG. 3 is performed. The user equipment may also calculate the time interval Np through the formula of $Np=\lfloor P/(J*K+1) \rfloor$.

In the second manner for determining parameters required for the CSI feedback in the LTE-A system, firstly, the feedback period P of the optimum subband PMI and the feedback period and feedback position offset of the wideband CSI is also configured through a high layer, wherein the feedback period P of the optimum subband PMI is an integral multiple of a transmission period of the CSI-RS. Hereafter, the time interval Np is determined firstly, and then, in accordance with the feedback period P of the optimum subband PMI, the time interval Np, and a number J of the BPs in the system bandwidth, the number of times K of information feedback is calculated through a formula of $K=\lfloor (P/Np-1)/J \rfloor$.

Thus, since the user equipment may also determine the number J of the BPs through the system bandwidth, only information containing the feedback period P of the optimum subband PMI, the time interval Np, and the feedback period and feedback position offset of the wideband CSI is required to be transmitted to the user equipment when the step S320 shown in FIG. 3 is performed. The user equipment may also calculate the number of times K of information feedback through the formula of $K=\lfloor (P/Np-1)/J \rfloor$.

After the user equipment accomplishes the determining of the parameters required for the CSI feedback in the LTE-A system, it may feedback the CSI according to the feedback structure of the LTE-A system in the PUCCH in response to the received CSI-RS.

In the method for CSI feedback in the LTE-A system according to the third embodiment of the invention, the optimum subband PMI in all of the BPs are jointly encoded, and the feedback period P thereof is an integral multiple of a transmission period of the CSI-RS. The specific feedback period is configured by the high layer. That is, the optimum subband PMI fed back is information obtained by jointly encoding the optimum subband PMI in all of the BPs.

With the method for CSI feedback in the LTE-A system according to the third embodiment of the invention, a case that a same CSI for a certain subband is fed back twice at different positions, i.e., a case of repeated feedback which will occur in the first embodiment may also be avoided.

FIG. 7 illustrates an example for CSI feedback in the LTE-A system according to the third embodiment of the invention.

As shown in FIG. 7, the optimum subband PMI in all of the BPs are jointly encoded, and the feedback period P thereof is configured by the high layer, which is P=10 ms in this example. Each subband CQI is transmitted between two subband PMI positions. The base station determines two parameters. The first parameter is the number of times K of the selected subband CQI feedback for each of BPs between two subband PMI feedback positions, which is K=1 herein. The second parameter is the time interval Np between adjacent BP information feedback, which is $Np=\lfloor P/(J*K+1) \rfloor=2$ determined according to three parameters of P=10, K=1, and J=4. The feedback of wideband PMI and/or wideband CQI is similar to that of RI in the LTE system, the period and feedback position offset thereof is configured by the high layer. Since the feedback period P of the optimum subband PMI is configured to be an integral multiple of a transmission period of the CSI-RS, the case of repeated feedback shown in FIGS. 4 and 5 will not occur.

Figure 8:
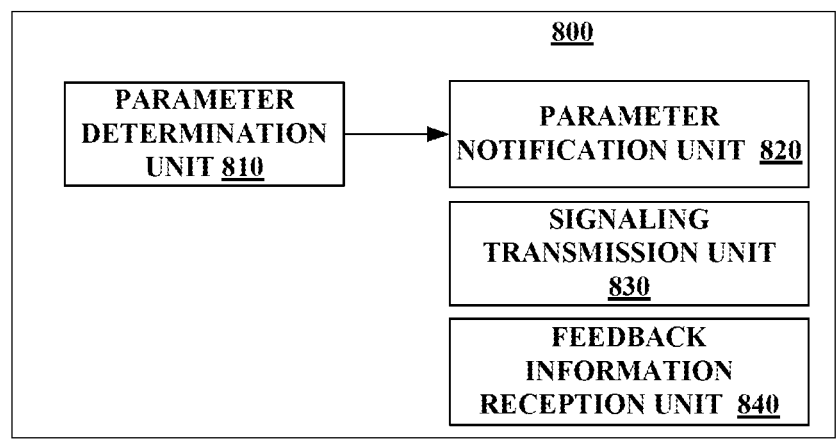
FIG. 8 is a block diagram illustrating an apparatus for CSI feedback in the LTE-A system according to the embodiment of the invention.

Hereinafter, an apparatus for CSI feedback in the LTE-A system according to the embodiment of the invention is further described in detail in conjunction with the drawings. FIG. 8 is a block diagram illustrating an apparatus 800 for CSI feedback in the LTE-A system according to the embodiment of the invention.

As shown in FIG. 8, the apparatus 800 according to the embodiment of the invention includes a parameter determination unit 810, a parameter notification unit 820, a signaling transmission unit 830, and a feedback information reception unit 840.

The parameter determination unit 810 is adapted to determine parameters required for the CSI feedback in the LTE-A system, and such parameters are determined such that a feedback structure of the LTE-A system in PUCCH can be based on a feedback structure of the LTE system in the PUCCH.

The parameter notification unit 820 is adapted to notify the parameters determined by the parameter determination unit 810 to a user equipment.

The signaling transmission unit 830 is adapted to transmit a CSI-RS to the user equipment periodically, so that the user equipment calculates the CSI required to be fed back.

The feedback information reception unit 840 is adapted to receive the CSI fed back by the user equipment according to the feedback structure of the LTE-A system in the PUCCH in response to the CSI-RS transmitted by the signaling transmission unit 830.

According to the preferred embodiment of the invention, the parameters determined by the parameter determination unit 810 include a feedback period P of wideband CSI, the number of times K of information feedback for each of BPs in system bandwidth within the feedback period P of the wideband CSI, and a time interval Np between adjacent BP information feedback within the feedback period P of the wideband CSI.

The parameter determination unit 810 is further adapted to configure the number of times K of information feedback and the time interval Np through a high layer, and to calculate, in accordance with the number of times K of information feedback, the time interval Np, and a number J of the BPs in the system bandwidth, the feedback period P of the wideband CSI through a formula of $P=(J*K+1)*Np$.

In this case, the parameter notification unit 820 is further adapted to transmit information containing the number of times K of information feedback and the time interval Np to the user equipment, so that the user equipment calculates the feedback period P of the wideband CSI through the formula of $P=(J*K+1)*Np$.

In this case, in the feedback information received by the feedback information reception unit 840, information fed back for each BP is information obtained by jointly encoding optimum subband CQI with optimum subband PMI in the BP.

In this case, a case of repeated feedback, i.e., a case that a same CSI for a certain subband is fed back twice at different positions, may occur with some feedback parameters. In order to address such case, the apparatus 800 according the preferred embodiment of the invention may further include a repeated feedback judgment unit (not shown). The repeated feedback judgment unit is adapted to judge, in accordance with the parameters determined by the parameter determination unit 810, whether a repeated feedback of information for the BP will occur when the user equipment feeds back the calculated CSI in response to the CSI-RS transmitted by the signaling transmission unit 830. If the repeated feedback judgment unit determines that the repeated feedback will occur, the repeated feedback judgment unit further determines that the user equipment does not feed back any information at a position where the repeated feedback will occur, and does not calculate information for the BP at the position. Alternatively, the repeated feedback judgment unit further determines that the user equipment feeds back other information than the information obtained by jointly encoding the optimum subband CQI with the subband PMI in the BP at the position where the repeated feedback will occur.

According to another preferred embodiment of the invention, the parameters determined by the parameter determination unit 810 also include a feedback period P of wideband CSI, the number of times K of information feedback for each of BPs in system bandwidth within the feedback period P of the wideband CSI, and a time interval Np between adjacent BP information feedback within the feedback period P of the wideband CSI.

The parameter determination unit 810 is further adapted to configure the feedback period P of the wideband CSI through a high layer, so that the feedback period P of the wideband CSI is an integral multiple of a transmission period of the CSI-RS, and to firstly determine the number of times K of information feedback, and then calculate, in accordance with the feedback period P of the wideband CSI, the number of times K of information feedback, and a number J of the BPs in the system bandwidth, the time interval Np through a formula of $Np=\lfloor P/(J*K+1)\rfloor$.

In this case, the parameter notification unit 820 is further adapted to transmit information containing the feedback period P of the wideband CSI and the number of times K of information feedback to the user equipment, so that the user equipment calculates the time interval Np through the formula of $Np=\lfloor P/(J*K+1)\rfloor$.

Alternatively, the parameter determination unit 810 is further adapted to configure the feedback period P of the wideband CSI through a high layer, so that the feedback period P of the wideband CSI is an integral multiple of the transmission period of the CSI-RS, and to firstly determine the time interval Np, and then calculate, in accordance with the feedback period P of the wideband CSI, the time interval Np, and a number J of the BPs in the system bandwidth, the number of times K of information feedback through a formula of $K=\lfloor(P/Np-1)/J\rfloor$.

In this case, the parameter notification unit 820 is further adapted to transmit information containing the feedback period P of the wideband CSI and the time interval Np to the user equipment, so that the user equipment calculates the number of times K of information feedback through the formula of $K=\lfloor(P/Np-1)/J\rfloor$.

Also in above two cases, in the feedback information received by the feedback information reception unit 840, information fed back for each BP is information obtained by jointly encoding optimum subband CQI with optimum subband PMI in the BP.

According to still another preferred embodiment of the invention, the parameters determined by the parameter determination unit 810 include a feedback period P of optimum subband PMI, the number of times K of information feedback for each of BPs in system bandwidth within the feedback period P of the optimum subband PMI, a time interval Np between adjacent BP information feedback within the feedback period P of the optimum subband PMI, and a feedback period and a feedback position offset of wideband CSI.

The parameter determination unit 810 is further adapted to configure the feedback period P of the optimum subband PMI and the feedback period and feedback position offset of the wideband CSI through a high layer, wherein the feedback period P of the optimum subband PMI is an integral multiple of a transmission period of the CSI-RS, and to firstly determine the number of times K of information feedback, and then calculate, in accordance with the feedback period P of the optimum subband PMI, the number of times K of information feedback, and a number J of the BPs in the system bandwidth, the time interval Np through a formula of $Np=\lfloor P/(J*K+1)\rfloor$.

In this case, the parameter notification unit 820 is further adapted to transmit information containing the feedback period P of the optimum subband PMI, the number of times K of information feedback, and the feedback period and feedback position offset of the wideband CSI to the user equipment, wherein the user equipment calculates the time interval Np through the formula of $Np=\lfloor P/(J*K+1)\rfloor$.

Alternatively, the parameter determination unit 810 is further adapted to configure the feedback period P of the optimum subband PMI and the feedback period and feedback position offset of the wideband CSI through a high layer, wherein the feedback period P of the optimum subband PMI is an integral multiple of the transmission period of the CSI-RS, and to firstly determine the time interval Np, and then calculate, in accordance with the feedback period P of the optimum subband PMI, the time interval Np, and a number J of the BPs in the system bandwidth, the number of times K of information feedback through a formula of $K=\lfloor(P/Np-1)/J\rfloor$.

In this case, the parameter notification unit 820 is further adapted to transmit information containing the feedback period P of the optimum subband PMI, the time interval Np, and the feedback period and feedback position offset of the wideband CSI to the user equipment, wherein the user equipment calculates the number of times K of information feedback through the formula of $K=\lfloor(P/Np-1)/J\rfloor$.

In above two cases, in the feedback information received by the feedback information reception unit 840, the optimum subband PMI fed back is information obtained by jointly encoding the optimum subband PMI in all of the BPs.

The various specific implementations of the respective units above in the apparatus 800 have been described in detail previously, and therefore the explanations thereof will not be repeated herein.

Figure 9:
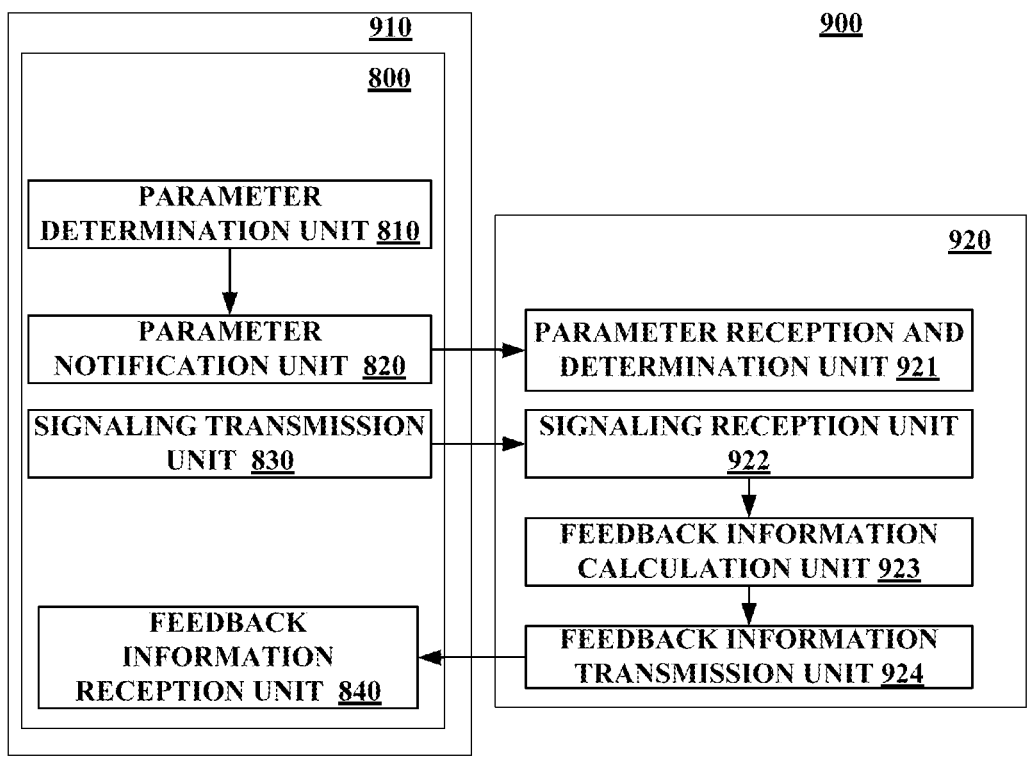
FIG. 9 is a block diagram illustrating a wireless communication system according to the embodiment of the invention.

The method and apparatus above of the invention may be used in a wireless communication system. FIG. 9 is a block diagram illustrating a wireless communication system 900 according to the embodiment of the invention.

As shown in FIG. 9, the wireless communication system 900 includes a base station 910 and user equipment 920. The base station 910 includes the apparatus 800 for CSI feedback in the LTE-A system as shown in FIG. 8, which includes a parameter determination unit 810, a parameter notification unit 820, a signaling transmission unit 830, and a feedback information reception unit 840. The user equipment 920 includes: a parameter reception and determination unit 921 adapted to receive and determine parameters required for the CSI feedback in the LTE-A system from the parameter notification unit 820 in the apparatus 800 in the base station 910; a signaling reception unit 922 adapted to receive a CSI-RS transmitted from the signaling transmission unit 830 in the apparatus 800 in the base station 910; a feedback information calculation unit 923 adapted to calculate the CSI required to be fed back in response to the CSI-RS received by the signaling reception unit 922; and a feedback information transmission unit 924 adapted to transmit the CSI calculated by the feedback information calculation unit 923 to the feedback information reception unit 840 in the apparatus 800 in the base station 910.

The various specific implementations of the respective apparatus or units above in the wireless communication system 900 have also been described in detail previously, and therefore the explanations thereof will not be repeated herein.

Apparently, respective operating processes of the method above according to the invention can be implemented in a manner of a computer executable program stored on a machine-readable storage medium.

And, the object of the invention can be implemented in a manner that the storage medium on which the computer executable program above is carried is provided directly or indirectly to a system or apparatus, a computer or a Central Processing Unit (CPU) of which reads out and executes the computer executable program. Here, the implementation of the invention is not limited to a program as long as the system or apparatus has a function to execute the program, and the program can be in arbitrary forms such as an objective program, a program executed by an interpreter, a script program provided to an operating system, etc.

The machine-readable storage medium mentioned above includes, but is not limited to, various memories and storage units, a semiconductor device, a disk unit such as an optic disk, a magnetic disk and a magneto-optic disk, and other medium suitable for storing information.

Additionally, the invention can also be implemented by connecting to a corresponding web site on the Internet through a computer, downloading and installing the computer executable program according to the invention into the computer, and then executing the program.

In the apparatus and method of the invention, it is obvious that respective components or steps can be decomposed and/or recombined. Such decomposition and/or recombination should be considered as an equivalent solution of the invention. And, the steps performing a series of processing above can be performed in the describing order naturally, but this is not necessary. Some steps can be performed concurrently or independently with one another.

Although the embodiment of the invention has been described in detail in combination with the drawings above, it should be understood that, the embodiment described above is only used to explain the invention and is not constructed as the limitation to the invention. For those skilled in the art, various modification and alternation can be made to the above embodiment without departing from the essential and scope of the invention. Therefore, the scope of the invention is only defined by the appended claims and the equivalents thereof.

The invention claimed is:

1. A method for Channel State Information, CSI, feedback in a wireless communication system, comprising:
    determining parameters required for the CSI feedback in a first wireless communication system, the parameters including a feedback period P of wideband CSI, the number of times K of information feedback for each of Bandwidth Parts, BPs, in system bandwidth within the feedback period P of the wideband CSI, and a time interval Np between adjacent BP information feedback within the feedback period P of the wideband CSI, so that a feedback structure of the first wireless communication system in Physical Uplink Control Channel, PUCCH, is based on a feedback structure of a second wireless communication system in the PUCCH;
    notifying the parameters to a user equipment;
    transmitting a Channel State Information Reference Symbol, CSI-RS, to the user equipment periodically, so that the user equipment calculates the CSI required to be fed back; and
    receiving the CSI fed back by the user equipment according to the feedback structure of the first wireless communication system in the PUCCH in response to the CSI-RS, wherein information fed back for each BP is information obtained by jointly encoding optimum subband Channel Quality Information, CQI, with optimum subband Pre-encoding Matrix Information, PMI, in the BP,
    wherein determining the parameters required for the CSI feedback in the first wireless communication system comprises:
    configuring the feedback period P of the wideband CSI through a high layer, so that the feedback period P of the wideband CSI is an integral multiple of a transmission period of the CSI-RS;
    firstly determining the number of times K of information feedback, and then calculating, in accordance with the feedback period P of the wideband CSI, the number of times K of information feedback, and a number J of the BPs in the system bandwidth, the time interval Np through a formula of $Np=\lfloor P/(J*K+1) \rfloor$, and
    notifying the parameters to the user equipment comprises:
    transmitting information containing the feedback period P of the wideband CSI and the number of times K of information feedback to the user equipment, so that the user equipment calculates the time interval Np through the formula of $Np=\lfloor P/(J*K+1) \rfloor$,
    or
    wherein determining the parameters required for the CSI feedback in the first wireless communication system comprises:
    configuring the feedback period P of the wideband CSI through a high layer, so that the feedback period P of the wideband CSI is an integral multiple of the transmission period of the CSI-RS;
    firstly determining the time interval Np, and then calculating, in accordance with the feedback period P of the wideband CSI, the time interval Np, and a number J of the BPs in the system bandwidth, the number of times K of information feedback through a formula of $K=\lfloor (P/Np-1)/J \rfloor$, and
    notifying the parameters to the user equipment comprises:
    transmitting information containing the feedback period P of the wideband CSI and the time interval Np to the user equipment, so that the user equipment calculates the number of times K of information feedback through the formula of $K=\lfloor (P/Np-1)/J \rfloor$.

2. The method according to claim 1, further comprising:
    judging, in accordance with the determined parameters, whether a repeated feedback of information for the BP will occur when the user equipment feeds back the calculated CSI in response to the CSI-RS; and
    if it is determined that the repeated feedback will occur, then
    determining that the user equipment does not feed back any information at a position where the repeated feedback will occur, and does not calculate information for the BP at the position, or
    determining that the user equipment feeds back other information than the information obtained by jointly encoding the optimum subband CQI with the subband PMI in the BP at the position where the repeated feedback will occur.

3. A method for Channel State Information, CSI, feedback in a wireless communication system, comprising:
determining parameters required for the CSI feedback in a first wireless communication system, the parameters including a feedback period P of optimum subband Pre-encoding Matrix Information, PMI, the number of times K of information feedback for each of Bandwidth Parts, BPs, in system bandwidth within the feedback period P of the optimum subband PMI, a time interval Np between adjacent BP information feedback within the feedback period P of the optimum subband PMI, and a feedback period and a feedback position offset of wideband CSI, so that a feedback structure of the first wireless communication system in Physical Uplink Control Channel, PUCCH, is based on a feedback structure of a second wireless communication system in the PUCCH;
notifying the parameters to a user equipment;
transmitting a Channel State Information Reference Symbol, CSI-RS, to the user equipment periodically, so that the user equipment calculates the CSI required to be fed back; and
receiving the CSI fed back by the user equipment according to the feedback structure of the first wireless communication system in the PUCCH in response to the CSI-RS, wherein the optimum subband PMI fed back is information obtained by jointly encoding the optimum subband PMI in all of the BPs,
wherein determining the parameters required for the CSI feedback in the first wireless communication system comprises:
configuring the feedback period P of the optimum subband PMI and the feedback period and feedback position offset of the wideband CSI through a high layer, wherein the feedback period P of the optimum subband PMI is an integral multiple of a transmission period of the CSI-RS;
firstly determining the number of times K of information feedback, and then calculating, in accordance with the feedback period P of the optimum subband PMI, the number of times K of information feedback, and a number J of the BPs in the system bandwidth, the time interval Np through a formula of $Np=\lfloor P/(J*K+1) \rfloor$, and
notifying the parameters to the user equipment comprises:
transmitting information containing the feedback period P of the optimum subband PMI, the number of times K of information feedback, and the feedback period and feedback position offset of the wideband CSI to the user equipment, wherein the user equipment calculates the time interval Np through the formula of $Np=\lfloor P/(J*K+1) \rfloor$,
or
wherein determining the parameters required for the CSI feedback in the first wireless communication system comprises:
configuring the feedback period P of the optimum subband PMI and the feedback period and feedback position offset of the wideband CSI through a high layer, wherein the feedback period P of the optimum subband PMI is an integral multiple of a transmission period of the CSI-RS;
firstly determining the time interval Np, and then calculating, in accordance with the feedback period P of the optimum subband PMI, the time interval Np, and a number J of the BPs in the system bandwidth, the number of times K of information feedback through a formula of $K=\lfloor (P/Np-1)/J \rfloor$, and
notifying the parameters to the user equipment comprises:
transmitting information containing the feedback period P of the optimum subband PMI, the time interval Np, and the feedback period and feedback position offset of the wideband CSI to the user equipment, wherein the user equipment calculates the number of times K of information feedback through the formula of $K=\lfloor (P/Np-1)/J \rfloor$.

4. An apparatus for Channel State Information, CSI, feedback in a wireless communication system, comprising:
a parameter determination unit adapted to determine parameters required for the CSI feedback in a first wireless communication system, the parameters including a feedback period P of wideband CSI, the number of times K of information feedback for each of Bandwidth Parts, BPs, in system bandwidth within the feedback period P of the wideband CSI, and a time interval Np between adjacent BP information feedback within the feedback period P of the wideband CSI, so that a feedback structure of the first wireless communication system in Physical Uplink Control Channel, PUCCH, is based on a feedback structure of a second wireless communication system in the PUCCH;
a parameter notification unit adapted to notify the parameters determined by the parameter determination unit to a user equipment;
a signaling transmission unit adapted to transmit a Channel State Information Reference Symbol, CSI-RS, to the user equipment periodically, so that the user equipment calculates the CSI required to be fed back; and
a feedback information reception unit adapted to receive the CSI fed back by the user equipment according to the feedback structure of the first wireless communication system in the PUCCH in response to the CSI-RS transmitted by the signaling transmission unit, wherein information fed back for each BP is information obtained by jointly encoding optimum subband Channel Quality Information, CQI, with optimum subband Pre-encoding Matrix Information, PMI, in the BP,
wherein the parameter determination unit is adapted to configure the feedback period P of the wideband CSI through a high layer, so that the feedback period P of the wideband CSI is an integral multiple of a transmission period of the CSI-RS, and to firstly determine the number of times K of information feedback, and then calculate, in accordance with the feedback period P of the wideband CSI, the number of times K of information feedback, and a number J of the BPs in the system bandwidth, the time interval Np through a formula of $Np=\lfloor P/(J*K+1) \rfloor$, and
the parameter notification unit is adapted to transmit information containing the feedback period P of the wideband CSI and the number of times K of information feedback to the user equipment, so that the user equipment calculates the time interval Np through the formula of $Np=\lfloor P/(J*K+1) \rfloor$,
or
wherein the parameter determination unit is adapted to configure the feedback period P of the wideband CSI through a high layer, so that the feedback period P of the wideband CSI is an integral multiple of the transmission period of the CSI-RS, and to firstly determine the time interval Np, and then calculate, in accordance with the feedback period P of the wideband CSI, the time interval Np, and a number J of the BPs in the system bandwidth, the number of times K of information feedback through a formula of $K=\lfloor (P/Np-1)/J \rfloor$, and the parameter notification unit is adapted to transmit information containing the feedback period P of the wideband CSI and the time interval Np to the user equipment, so that the user equipment calculates the number of times K of information feedback through the formula of $K=\lfloor(P/Np-1)/J\rfloor$.

5. The apparatus according to claim 4, further comprising:
a repeated feedback judgement unit adapted to judge, in accordance with the parameters determined by the parameter determination unit, whether a repeated feedback of information for the BP will occur when the user equipment feeds back the calculated CSI in response to the CSI-RS transmitted by the signaling transmission unit; and
if the repeated feedback judgement unit judges that the repeated feedback will occur, then
the repeated feedback judgement unit further determines that the user equipment does not feed back any information at a position where the repeated feedback will occur, and does not calculate information for the BP at the position, or
the repeated feedback judgement unit further determines that the user equipment feeds back other information than the information obtained by jointly encoding the optimum subband CQI with the subband PMI in the BP at the position where the repeated feedback will occur.

* * * * *